US012428280B2

(12) United States Patent
Masuda et al.

(10) Patent No.: US 12,428,280 B2
(45) Date of Patent: Sep. 30, 2025

(54) METHOD AND DEVICE FOR PREVENTING COLLISION OF AERIAL WORK PLATFORM WITH UPWARD OBSTACLE

(71) Applicant: HOKUETSU INDUSTRIES CO., LTD., Tsubame Niigata (JP)

(72) Inventors: Isao Masuda, Tsubame Niigata (JP); Toshihiro Chihara, Tsubame Niigata (JP)

(73) Assignee: HOKUETSU INDUSTRIES CO., LTD., Tsubame Niigata (JP)

(*) Notice: Subject to any disclaimer, the term of this patent is extended or adjusted under 35 U.S.C. 154(b) by 887 days.

(21) Appl. No.: 17/637,050

(22) PCT Filed: Aug. 24, 2020

(86) PCT No.: PCT/JP2020/031878
§ 371 (c)(1),
(2) Date: Feb. 21, 2022

(87) PCT Pub. No.: WO2021/039738
PCT Pub. Date: Mar. 4, 2021

(65) Prior Publication Data

US 2022/0281730 A1 Sep. 8, 2022

(30) Foreign Application Priority Data

Aug. 26, 2019 (JP) ................................ 2019-153997

(51) Int. Cl.
*B66F 17/00* (2006.01)
*B66F 11/04* (2006.01)

(52) U.S. Cl.
CPC ............ *B66F 17/006* (2013.01); *B66F 11/04* (2013.01)

(58) Field of Classification Search
CPC ............................... B66F 11/04; B66F 17/006
(Continued)

(56) References Cited

U.S. PATENT DOCUMENTS

2005/0187712 A1* 8/2005 Callaghan ............. B66B 5/0031 701/301
2017/0243372 A1* 8/2017 Iida ........................... G06T 7/75
(Continued)

FOREIGN PATENT DOCUMENTS

JP S63-133588 U 9/1988
JP 04-272098 A 9/1992
(Continued)

OTHER PUBLICATIONS

Woo Jong (KR 20090062780 A) Apparatus to Protect Impact for Work-Bench Elevated Position (Year: 2009).*
(Continued)

*Primary Examiner* — Jorge L Carrasquillo
(74) *Attorney, Agent, or Firm* — Ronald M. Kachmarik; Cooper Legal Group LLC

(57) ABSTRACT

During raising of a deck, a floor surface of the deck is irradiated, in a parallel-plane shape, with laser light serving as a planar beam from a prescribed height on one end side of the deck, and a laser-light-passing surface, which is a surface through which the planar beam passes, is produced. The laser-light-passing surface is imaged at an oblique angle from below a laser generator by an imaging device capable of capturing an image of light having the wavelength of the laser light. When an upward obstacle reaches the laser-light-passing surface, a reflected part of the planar beam appears in the image due to the upward obstacle, and the appearance of the reflected part with respect to a detection region that includes a position above the deck is monitored, whereby the approach of the upward obstacle toward the deck can be reliably detected.

12 Claims, 12 Drawing Sheets

(58) Field of Classification Search
USPC .......................................................... 187/287
See application file for complete search history.

(56) References Cited

U.S. PATENT DOCUMENTS

| | | | | |
|---|---|---|---|---|
| 2019/0023548 | A1* | 1/2019 | Jones | B66F 9/24 |
| 2020/0095105 | A1* | 3/2020 | Yutzy | B66F 17/006 |

FOREIGN PATENT DOCUMENTS

| | | | |
|---|---|---|---|
| JP | 05-124800 | A | 5/1993 |
| JP | 08-012283 | A | 1/1996 |
| JP | 2016-055983 | A | 4/2016 |
| JP | 2017-151650 | A | 8/2017 |
| JP | 2019-055878 | A | 4/2019 |
| KR | 10-2009-0062780 | A | 6/2009 |

OTHER PUBLICATIONS

International Search Report corresponding to International Application No. PCT/JP2020/031878 dated Oct. 6, 2020, 5 pages.

* cited by examiner

METHOD AND DEVICE FOR PREVENTING COLLISION OF AERIAL WORK PLATFORM WITH UPWARD OBSTACLE

FIELD OF THE INVENTION

The present invention relates to a method for preventing collision and a device for preventing collision (hereinafter the device is also referred simply to as "collision prevention device") with obstacles (hereinafter referred to as "upper obstacles" in the present invention) existing above the deck on an aerial work platform, and more particularly to a method for preventing a deck, an equipment attached to the deck and a crew member, a load and the like on the deck from being collided with the upper obstacle in an aerial work platform equipped with a deck on which a crew member rides raising and lowering above an undercarriage equipped with a traveling device such as a wheel or a crawler, and an elevation mechanism such as a scissor link mechanism that raises and lowers the deck, and a device for executing the method.

As shown in FIG. 11A, the aerial work platform 100 is provided with a deck 130 that raises and lowers a crew member on a undercarriage 110 equipped with a traveling device 140 (wheels 141, 142 in the illustrated example) such as wheels and tracks, and an elevating mechanism 120 (scissor link mechanism in the illustrated example) for raising and lowering this deck 130 on the undercarriage 110, and is configured to be able to perform the above-mentioned elevating operation of the deck 130 by operating the switches, levers, etc. provided on the control panel 133 provided on the deck 130.

Such an aerial work platform 100 is, for example indoor use or work on the bottom of a bridge, etc., often used in a place where an obstacle (included in the upper obstacle) such as a ceiling or a bottom surface of a bridge exists above the aerial work platform 100.

When used in the presence of an upper obstacle in this way, or when the maximum ground clearance in case of the deck 130 to be raised to the maximum, exceeds the height of the upper obstacle such as the ceiling or the bottom of the bridge, if the deck 130 rises indefinitely, there is a risk that accidents may occur such as the head of a crew member on the deck 130 colliding with an upper obstacle such as the ceiling or the bottom of a bridge, or the crew member being caught between the safety rail 131 of the deck 130 and the upper obstacle.

Therefore, in order to prevent such accidents from occurring, it has been proposed that an aerial work platform 100 monitors the approach of an upper obstacle and, when the upper obstacle approaches to a predetermined distance from the deck 130, emits a warning sound to call the attention of the passengers, or emergently stops the raising movement of the deck 130 to prevent the aforementioned accidents from occurring.

As such an aerial work platform, the patent document 1 below proposes an aerial work platform 100 that detects an obstacle above by means of a proximity sensor 154 such as an ultrasonic sensor attached to the safety rail 131 of the deck 130, and when the obstacle above approaches a predetermined position, the proximity is notified to the passengers and the elevating operation of the deck 130 is emergently stopped (see FIG. 11A).

Although it does not disclose a method for detecting an obstacle above an aerial work platform, in Patent Document 2 described later, in order to prevent the head guard 232 provided on the upper part of the lift 240 from colliding with an upper obstacle when the lift 240 of the forklift 200 is raised, a forklift 200 in which the obstacle detection plate 282 is elastically arranged on the head guard 232 via an elastic body such as a spring 257 and a sensor 254 such as a limit switch or a pressure sensor that detects obstacles when a load exceeding a certain level of load is applied to the obstacle detection plate 282 is provided for stopping raising movement of the lift 240 by the detection signal from the sensor 254 is proposed (see FIG. 12).

RELATED ART DOCUMENTS

Patent Document

[Patent Document 1] Japanese Patent KOKAI No. 2016-55983 (LOPI; automatically published after around 18 months from filing date regardless prosecution)

[Patent Document 2] Japanese Utility Model Application Publication No. S63-133588

SUMMARY OF THE INVENTION

Problems to be Solved by the Invention

In the configuration of the aerial work platform 100 described in Patent Document 1 introduced above, when an upper obstacle such as a ceiling approaches due to the raising movement of the deck 130, a warning sound is given to the crew based on the detection signal from the proximity sensor 154 that detects the approach of the upper obstacle, and thanks to the emergency stop of the raising movement of the deck 130, the occurrence of accidents such as the head of a crew colliding with an upper obstacle or the crew being caught between the safety barrier 131 of the deck 130 and the upper obstacle is considered to be prevented.

However, in the aerial work platform 100 having the above configuration, when the upper obstacle exists as a surface such as a ceiling, the approach can be detected, yet among the upper obstacles, for example as shown by the broken line in FIG. 11A, there are also upper obstacles protruding downward from the ceiling, such as beams and lighting fixtures suspended from the ceiling.

Therefore, when the deck 130 is raising, it is assumed that such an upper obstacle exists in the non-detection area generated between the detection areas of the adjacent proximity sensors 154 and 154, and the approach of such an upper obstacle cannot be detected, then the upper obstacle still comes into contact with the head of the crew member and the like, and there is a risk of accidents where the crew member is caught between the safety barrier 131 and the upper obstacle.

In this way, when trying to reliably detect the approach of an upper obstacle that protrudes downward from the ceiling and the like, it is considered that, for example, as shown in FIG. 11B, the non-detection area may be eliminated by increasing the number of proximity sensors 154 attached on the safety barrier 131 of the deck 130, or the non-detection area may be narrowed to improve the detection accuracy, however adopting such a configuration leads to an increase in cost due to an increase in the number of parts.

Moreover, as shown in FIG. 11C, depending on the size of the deck 130, even if the number of proximity sensors 154 attached on the safety barrier 131 is increased in this way, it may not be possible to completely detect the upper obstacle, because a non-detection area still remains in the central portion of the deck 130.

On the other hand, in the forklift 200 described in Patent Document 2 described with reference to FIG. 12, the entire upper part of the head guard 232 is covered with an obstacle detection plate 282, and the lift 240 is configured to stop the raising movement when an upper obstacle comes into contact with the obstacle detection plate 282, therefore all upper obstacles above the obstacle detection plate 282 can be detected without omission.

Therefore, if a configuration is adopted in which the upper part of the deck of the aerial work platform is covered with the obstacle detection plate 282 described in Patent Document 2, whether it is the peripheral side or the central part of the deck 130, the approach of an upper obstacle existing above the deck can be detected without omission, and the safety of the crew members on the deck 130 can be protected.

However, if the configuration in which the upper part of the deck 130 of the aerial work platform 100 is covered with the obstacle detection plate 282 described above is adopted, the crew members on the deck 130 cannot work on the ceiling, or the bottom surface of the bridge, etc. above the deck 130 because they are obstructed by the obstacle detection plate 282, therefore the original function of the aerial work platform 100 will be greatly lost.

The present invention has been made to solve the shortcomings of the above-mentioned conventional art, so that the approach of an upper obstacle to the "surface" covering the upper part of the deck can be detected without omission, as in the obstacle detection plate 282 described in Patent Document 2 described above, and the objective is to provide a method for preventing the collision with upper obstacles and a collision prevention device for an aerial work platform which can reliably detect the approach of upper obstacles that partially exist above the deck 130, such as beams and lighting fixtures that protrude below the ceiling, and at the same time ensure workability above the deck 130.

Means for Solving the Problem

Means for solving the problems are described below with reference numerals used in the detailed description of the preferred embodiments. These reference numerals are intended to clarify the correspondence between the descriptions in the claims and the descriptions in the detailed description of the preferred embodiments, and it is needless to say that these reference numerals should not be used to restrictively interpret the technical scope of the present invention.

In order to achieve the above objective, a method for preventing collision with an upper obstacle for an aerial work platform 1 provided with an undercarriage 10, a deck 30 raising and lowering above the undercarriage 10, and an elevating mechanism 20 to cause the deck 30 to raise and lower according to the present invention; comprises:

irradiating laser light such as infrared ray laser as a planar beam 81 which is diffused in a planar shape parallel to a floor surface 32 of the deck 30 from a laser light irradiation position "rp" located at a position with a predetermined height H1 with respect to an upper end of the deck 30 (an upper end of a safety barrier 31 of the deck 30 in the illustrated example) at either end side of the deck 30 (a side of one end 30*a* in the illustrated example) during raising movement of the deck 30, and generating a laser light passing surface 82 which is a surface through which the irradiated planar beam 81 passes;

capturing an image of the laser light passing surface 82 from a bottom surface side of the laser light passing surface 82 by an image capturing device 52 capable of capturing the image of light having wavelength of the laser light from a lower side of the laser light irradiation position rp at the end side of the deck 30 (a side of one end 30*a* in the illustrated example); and setting a predetermined range of the captured image including a portion above the deck 30 and corresponding to the floor surface of the deck 30 as a detection area 85 and stopping the raising movement of the deck 30 when a reflecting portion (see FIG. 6C) of the planar beam 81 appears in the detection area 85 (FIGS. 1, 2, 4 to 6, 8, 9).

Preferably, in the method for preventing collision having the above configuration further comprises:

monitoring approach of the upper obstacle to the laser light irradiation position rp; and stopping the raising movement of the deck 30 not only when the reflecting portion appears in the detection area 85 but also when the upper obstacle approaches to a predetermined position with respect to the laser light irradiation position rp (FIGS. 7, 9).

Furthermore, preferably, when the laser light is invisible light such as infrared ray, visible light is irradiated, preferably, synchronously to irradiation of the planar beam 81, from a position adjacent to the laser light irradiation position rp in the planner shape parallel to the floor surface 32 of the deck 30 (FIGS. 4, 5).

Moreover, a device 50 for preventing collision with an upper obstacle (collision prevention device) for an aerial work platform 1 provided with an undercarriage 10, a deck 30 raising and lowering above the undercarriage 10, and an elevating mechanism 20 such as a scissor linkage mechanism to cause the deck 30 to raise and lower according to the present invention; comprises:

a laser light generator 51 for irradiating laser light as a planar beam 81 diffused in a planner shape parallel to a floor surface 32 of the deck 30 from a laser light irradiation position rp at a position with a predetermined height H1 with respect to an upper end of the deck 30 at either end side of the deck 30 during raising movement of the deck 30 to generate a laser light passing surface 82 which is a surface through which the irradiated planar beam 81 passes;

an image capturing device 52 such as an infrared laser camera capable of capturing an image of light having wavelength of the laser light, which is provided below the laser light generator 51 at the end side of the deck 30 for capturing an image of the laser light passing surface 82 from a bottom surface side of the laser light passing surface 82;

a reflecting portion detecting means (hereinafter referred to as reflecting portion detector) 61 setting a predetermined range of the image captured by the image capturing device 52, including a portion above the deck 30 and corresponding to the floor surface of the deck 30 as a detection area 85 and detecting appearance of a reflecting portion of the planar beam 81 in the detection area 85; and a raising movement regulating means (hereinafter referred to as raising movement regulator) 71 for stopping the raising movement of the deck 30 when the reflecting portion detector 61 detects that the reflecting portion in the laser passing surface 82 appears (FIGS. 1 to 9).

Preferably, in the device 50 for preventing collision with the upper obstacle with the above configuration, a sensor 54 such as an ultrasonic sensor or a limit switch for detecting proximity or contact of the upper obstacle is further attached to the laser light generator 51; and the raising movement regulator 71 stops the raising movement of the deck 30 not only when the reflecting portion detector 61 detects that the reflecting portion appears in the detection area 85, but also when the sensor 54 detects proximity or contact of the upper obstacle (FIG. 9).

Furthermore, when the deck 30 is an extension deck having a movable floor surface 32*a* that slides on a fixed floor surface 32*b*, and an area of the floor surface 32 is expanded by sliding the movable floor surface 32*a;* the deck 30 is provided with a sliding position detecting means (hereinafter referred to as sliding position detector) 56 for detecting a sliding position of the movable floor surface 32*a*; and may also be provided with a detection area setting means (hereinafter referred to as detection area setting unit) 62 for changing a setting range of the detection area 85 corresponding to the sliding position of the movable floor surface 32*a* detected by the sliding position detector 56 (FIGS. 2, 10).

Furthermore, preferably, when the laser light generator 51 is a generator of an invisible light laser such as an infrared laser, a visible light generator 53 to diffuse and irradiate visible light in a planner shape parallel to the floor surface 32 of the deck 30, preferably, synchronously to irradiation of the planar beam 81 by the laser light generator 51, is provided adjacent to the laser light generator 51 (FIGS. 4, 5).

Effect of the Invention

With the configuration of the present invention described above, the following remarkable effects could be obtained, according to the method for preventing collision for upper obstacles and the collision prevention device 50 in the aerial work platform 1 of the present invention.

During the raising movement of the deck 30, by irradiating the planar beam 81 above the deck 30 with the laser light generator 51 to generate the laser light passing surface 82, as well as by capturing an image of the laser light passing surface 82 from below the laser light generator 51 with an image capturing device 52 capable of capturing an image of the light having the wavelength of the laser light, when an upper obstacle enters the laser light passing surface 82, the image capturing device 52 receives the laser light that collides with the upper obstacle and is reflected, and a reflecting portion that reflects the reflected laser light appears in the corresponding portion of the captured image.

Therefore, while capturing the above images, if a predetermined range including the upper position of the deck 30 of the captured image is set as the detection area 85, and the appearance of the reflecting portion in the detection area 85 is detected, it could be determined that the upper obstacle has approached the deck 30 to the position where the laser light passing surface 82 is generated, and also it was possible to prevent the collision of the upper obstacle with the deck 30 and the crew by stopping the raising movement of the deck 30 accompanying with the detection from the reflecting portion.

On the other hand, in the method of the present invention, since the upper obstacle is not detected by a "plate" such as the obstacle detection plate 282 (see FIG. 12) in Patent Document 2 described above, yet the upper obstacle is detected by forming the laser light passing surface 82 which is a film of light covering the upper part of the deck, similar to the obstacle detection plate 282 of Patent Document 2, it is possible to detect all the upper obstacles that have reached the "plane" in a predetermined range without omission, however unlike the case where the upper part is covered with the "plate", workability for the upper part of the deck 30 is not impaired.

In the event that a sensor 54 such as an ultrasonic sensor or a limit switch for detecting the proximity or contact of an upper obstacle on the laser light generator 51 is provided, thereby the raising movement of the deck 30 is stopped by the raising movement regulator 71 even when the sensor 54 detects the proximity or contact of an upper obstacle, when an upper obstacle approaches or comes into contact with the sensor 54, therefore, when an upper obstacle approaches to a predetermined position with respect to the laser light generator 51 (laser light irradiation position rp) below the sensor 54, it was also possible to prevent the laser light generator 51 from colliding with an upper obstacle and being damaged by stopping the raising movement of the deck 30.

Further, when the deck 30 is raised, since an upper obstacle can enter the position where the laser light passing surface 82 is generated as described above, if the crew's body, materials attached on the deck 30 and the like protrude above the generation position of the laser light passing surface 82, they may collide with an upper obstacle during the raising movement of the deck 30.

However, if the laser light to be irradiated is invisible light, the crew cannot see the laser light with the naked eye, and even if a part of the body or materials protrudes onto the laser light passing surface 82, this cannot be discriminated by the naked eye.

On the other hand, in a configuration in which a visible light generator 53 is provided adjacent to the laser light generator 51 to irradiate visible light diffused in a planar shape parallel to the floor surface 32 of the deck 30, preferably, the laser light generator 51 and the visible light generator 53 are synchronized to control ON/OFF irradiation and stop the irradiation of the visible light at the same time as irradiation and stop of the irradiation of the planar beam 81, the visible light passing surface 83 (see FIGS. 4 and 5) is simultaneously generated by overlapping with the laser light passing surface 82 or in parallel with the laser light passing surface 82, thereby irradiation and stop of irradiation of the planar beam 81 can be confirmed by irradiation and stop of irradiation of visible light, and when a part of the body or materials crosses the laser light passing surface 82, it also crosses the visible light passing surface 83 at the same time, therefore, since "light lines" due to visible light emerge on the surface of the body and materials that cross the laser light passing surface 82 (visible light passing surface 83), the crew can visually recognize that the body, materials and the like are protruding upward beyond the laser light passing surface 82, and it is possible to avoid a collision accident due to such a protrusion.

When the aerial work platform 1 is used near a vertical wall surface and the like, a "line of light" indicating the generation position of the laser light passing surface 82 (visible light passing surface 83) emerges on this wall surface, therefore the crew can grasp the generation position of the laser light passing surface 82.

When the deck 30 is an extension deck in which the movable floor surface 32*a* slides on the fixed floor surface 32*b* and the area of the floor surface 32 changes, if the detection area 85 remains small corresponding to the setting of the original deck size despite the extension of the floor 32 of the deck 30, even if an upper obstacle is approaching on the deck 30 outside the detection area 85, it cannot be detected and there is a risk that the deck 30 and the crew will collide with the upper obstacle.

However, in the event that the deck 30 is provided with a sliding position detector 56 for detecting the sliding position of the movable floor surface 32*a*, and that the detection area setting unit 62 for changing the setting range of the detection area 85 is provided corresponding to the sliding position detected by the sliding position detection means 56, it could be possible to prevent an accident such as forgetting to change the setting, by automatically changing the range of the detection area 85 in conjunction with the expansion and reduction of the floor surface 32 of the deck 30.

EMBODIMENTS FOR CARRYING OUT THE INVENTION

The aerial work platform equipped with the device for preventing collision with upper obstacles according to the present invention is described below with reference to the accompanying drawings.

[Overall Configuration of Aerial Work Platforms]

Figure 1A:
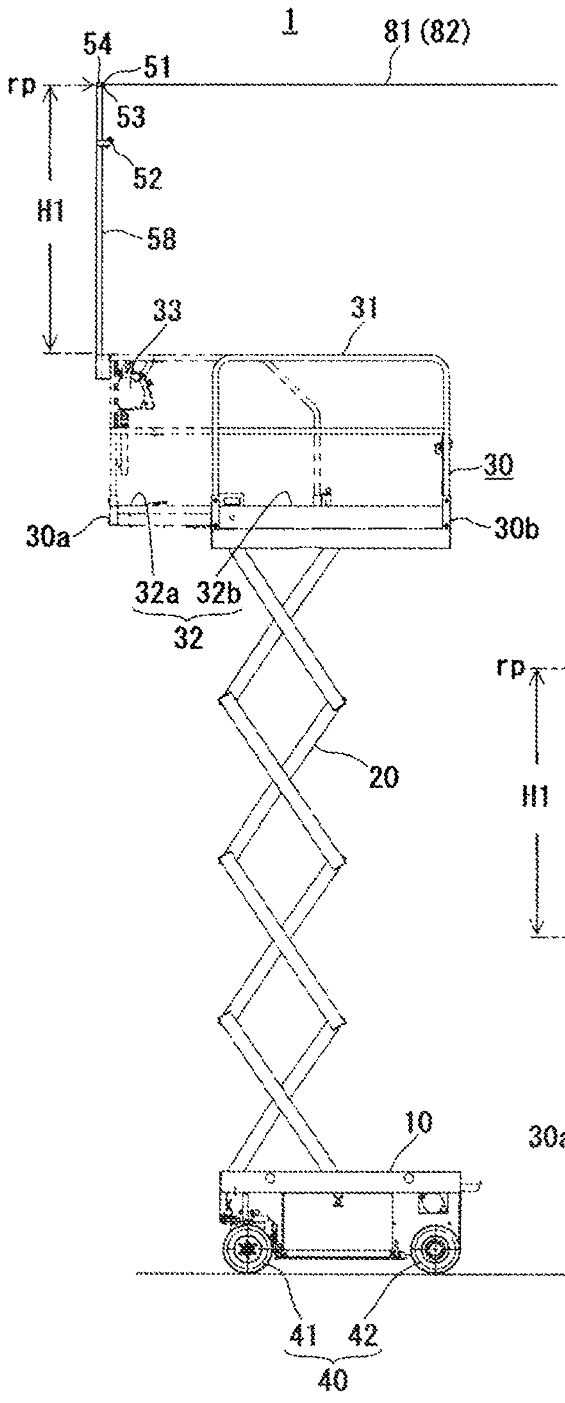
FIG. 1A is a side view of the aerial work platform provided with a device for preventing collision with an upper obstacle of the present invention, showing the state of which the deck is raised.
Figure 1B:
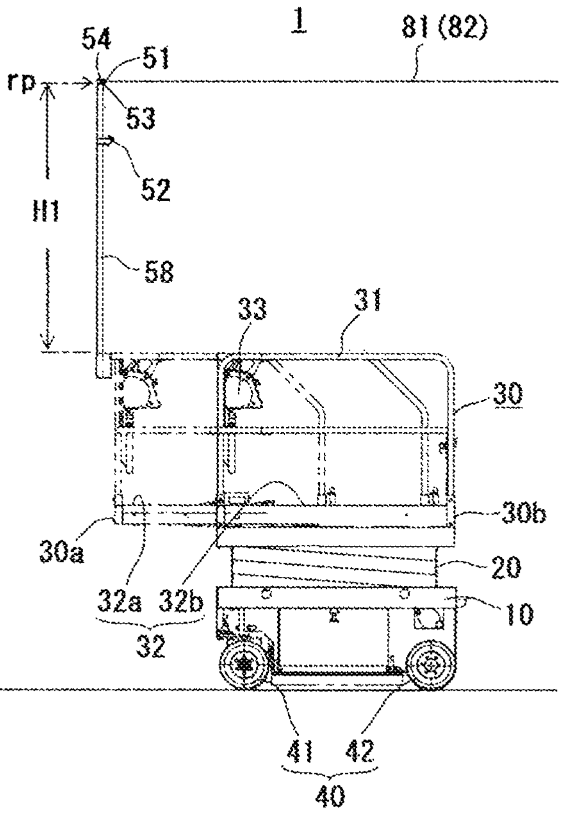
FIG. 1B is a side view of the aerial work platform provided with a device for preventing collision with an upper obstacle of the present invention showing the state of which the deck is lowered.

In FIG. 1, Reference numeral 1 is an aerial work platform equipped with the device for preventing collision with an upper obstacle according to the present invention, and this aerial work platform 1 is provided with an undercarriage 10 equipped with a wheel traveling device 40 composed of front wheels 41 and rear wheels 42 at both sides in the width direction respectively, a deck 30 raising and lowering above the undercarriage 10, which is mounted above the undercarriage 10 via an elevating mechanism 20 such as a scissor linkage mechanism.

A safety barrier 31 is provided on the deck 30 to prevent the crew members and luggage on the deck 30 from falling and the floor surface 32 of the deck 30 is composed of a movable floor surface 32*a* slidably attached on the fixed floor surface 32*b*, and also the movable floor surface 32*a* is configured as an extension deck in which the floor surface 32 is expanded to a side of one end 30*a* of the deck 30 by sliding the movable floor surface 32*a*. However, the floor surface 32 of the deck 30 could be a fixed type that does not slide.

At the side of the one end 30*a* of this deck 30, a control panel 33 is provided on the safety barrier 31, and by operating the switches, levers and the like provided on the control panel 33, it is configured to be able to input operation commands such as forward, backward, steering and other running operations of the aerial work platform 1, raising and lowering operation of the deck 30 of the aerial work platform 1, and the sliding operations of the floor surface 32.

Figure 2:
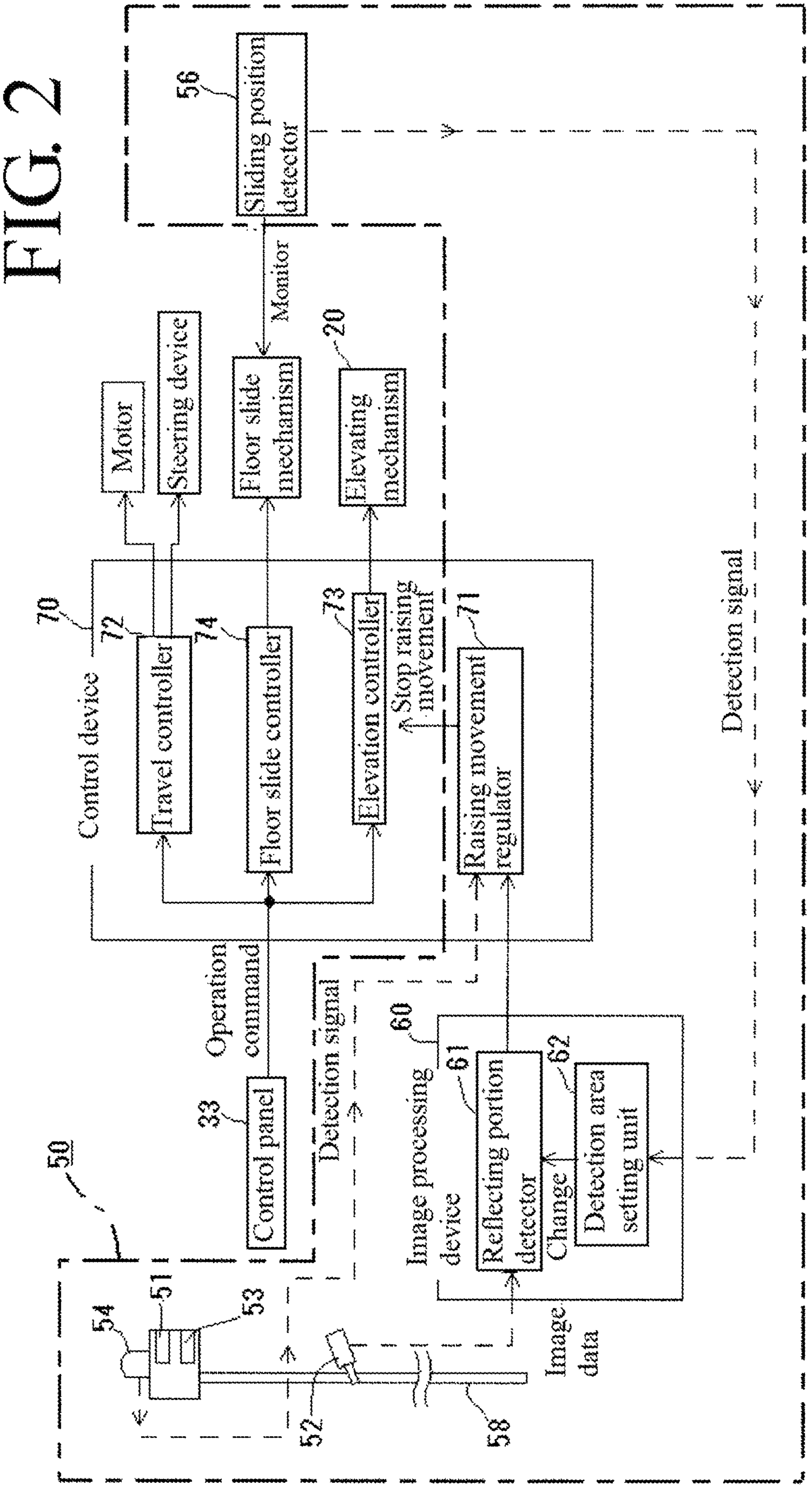
FIG. 2 is a functional block diagram of a device for preventing collision with an upper obstacle of the present invention.

As shown in FIG. 2, the operation command input via the control panel 33 is input to the control device 70 configured by an electronic control device such as a microcontroller etc., and the traveling controller 72, the elevation controller 73, and the floor slide controller 74 realized in the control device 70 are configured to operate each part according to the operation of the control panel 33 by the crew.

As an example, the travel controller 72 that receives the operation command input via the control panel 33 controls the travel motor and the steering device provided on the undercarriage according to the operation command to control the travel of the aerial work platform, and further, the elevation controller 73 controls the operation of a control valve (not shown) or a hydraulic pump (not shown) that controls the supply and discharge of hydraulic oil to, for example, a hydraulic cylinder (not shown) provided in the elevating mechanism 20 and performs the elevating operation of the deck 30 by the elevating mechanism 20 according to the operation command.

Further, the floor surface slide controller 74 slides the movable floor surface 32*a* to a position corresponding to the operation command by controlling the operation of the pinion motor (not shown) of the floor slide mechanism, for example, the rack mechanism (not shown) in response to the operation command.

In this embodiment, it should be noted that the side of the floor surface of the deck 30 is described as a configuration in which the floor slide controller 74 is performed on the floor slide mechanism according to the operation of the control panel 33 by the crew, however, instead of this configuration, or in combination with this configuration, the floor surface may be manually slid.

[Collision Prevention Device]

(1) Overall Configuration of the Collision Prevention Device

The aerial work platform 1 configured as described above is provided with the collision prevention device 50 that detects the approach of an upper obstacle to the deck 30 during the raising movement of the deck 30 and stops the raising movement of the deck 30.

As shown in FIG. 2, this collision prevention device 50 is equipped with a laser light generator 51, an image capturing device 52, a reflecting portion detector 61, and a raising movement regulator 71, and preferably further equipped with a sensor 54 and a visible light generator 53.

Also, as mentioned above, when the deck 30 is an extension deck in which the movable floor surface 32*a* slides and the area of the floor surface 32 changes, the collision prevention device 50 may be further provided with a sliding position detector 56 and a detection area setting unit 62.

(2) Laser Light Generator

Among the components of the collision prevention device 50, during the raising movement of the deck 30, at any end side (the side of one end 30*a* in the illustrated example) in the longitudinal direction of the deck 30, the above-mentioned laser light generator 51 is attached to laser light irradiation position rp at a position with a predetermined height H1 with respect to the deck 30 (safety barrier 31 of the deck 30 in the illustrated example), and irradiates a planar beam 81 of laser light such as an infrared laser diffused in a planar shape parallel to the floor surface 32 of the deck 30.

In this embodiment, this laser light generator 51 is attached to the tip of a support rod 58 erected on the deck 30 (erected on a safety barrier 31 in the illustrated example) of an aerial work platform, as a result, it is always held at a position with a predetermined height H1 as the deck 30 moves up.

Figure 5:
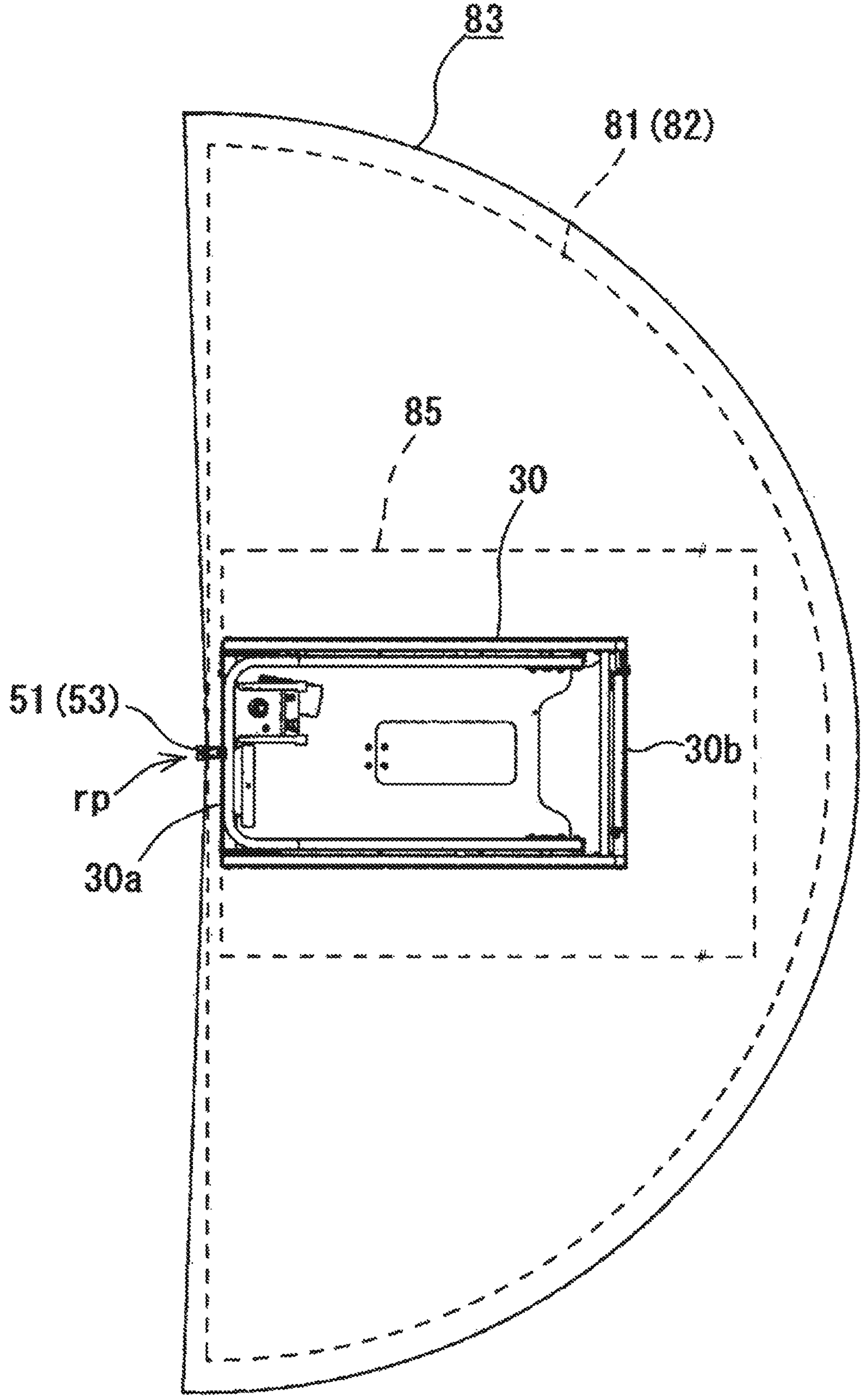
FIG. 5 is an explanatory plan view showing a positional relationship between a deck, a laser light passing surface, a visible light passing surface, and a detection area.

As described above, the laser light generator 51 diffuses the laser light in a planar shape parallel to the floor surface 32 of the deck 30 and irradiates it as a planar beam 81, and by the irradiation of the planar beam 81, a laser light passing surface 82 which is a passing surface of the planar beam 81 is generated above the deck so as to cover the upper part of the deck 30 as shown in FIGS. 1 and 5.

In this embodiment, as such a laser light generator 51, one that irradiates an infrared laser having a wavelength of 940 nm is used, yet if the laser light generator 51 can irradiate the above-mentioned planar beam 81 to generate a laser light passing surface 82 that covers the upper part of the deck 30, various known laser light generators without being limited to the above could be used.

Further, in the present embodiment, as shown in FIG. 5, the laser light generator 51 is provided in the center in the width direction of the deck 30 on the side of the one end 30*a* of the deck 30 in plain view, however if the position is such that the above-mentioned laser light passing surface 82 can be generated so as to cover the entire upper part of the deck 30, the arrangement of the laser light generator 51 is not limited to the illustrated example, and may be provided at another position such as the side of the other end 30*b* of the deck in a plan view or a corner portion.

(3) Visible Light Generator

Figure 3:
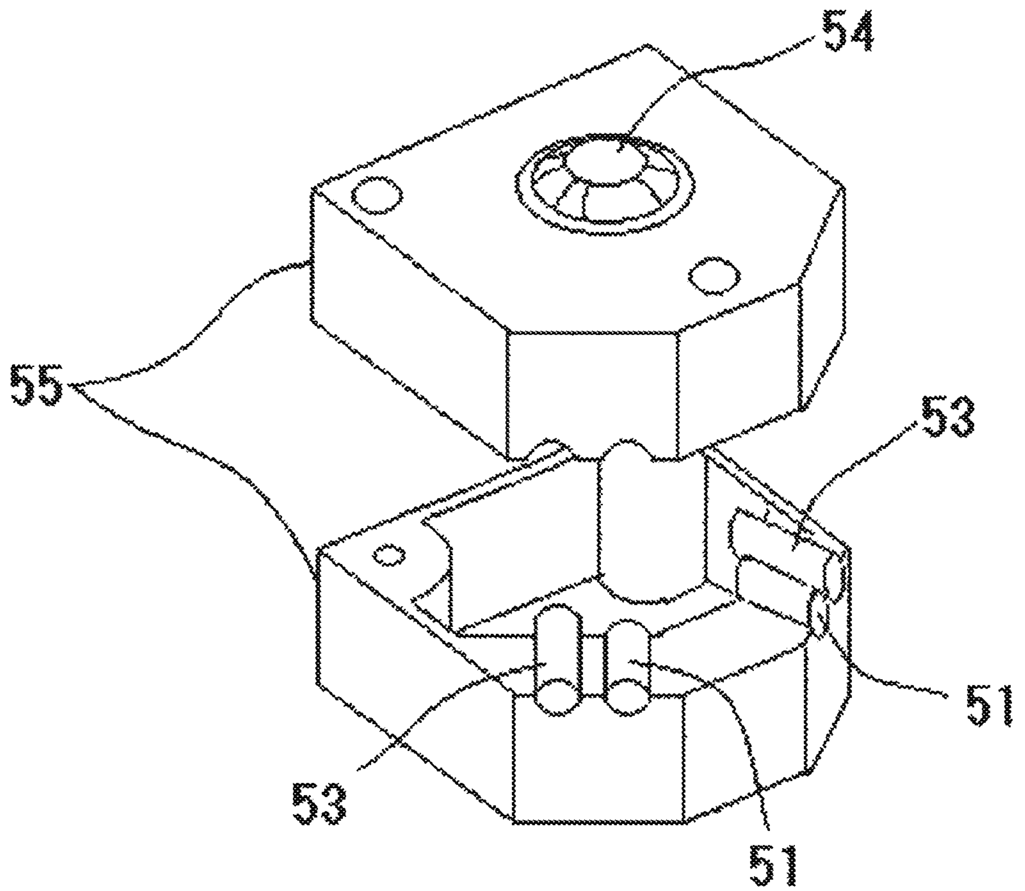
FIG. 3 is an exploded perspective view of a light generator formed by incorporating a laser light generator and a visible light generator into a common casing.

In the configuration of this embodiment which irradiates an infrared laser having a wavelength of 940 nm which is invisible light, as the laser light generator 51, as shown in FIGS. 1 to 3, a visible light generator 53 is provided adjacent to the laser light generator 51 to irradiate visible light by diffusing it in a planar shape parallel to the floor surface 32 of the deck 30, and by irradiating the visible light with the visible light generator 53, the crew can confirm the formation position of the laser light passing surface 82 with the naked eye.

Figure 4:
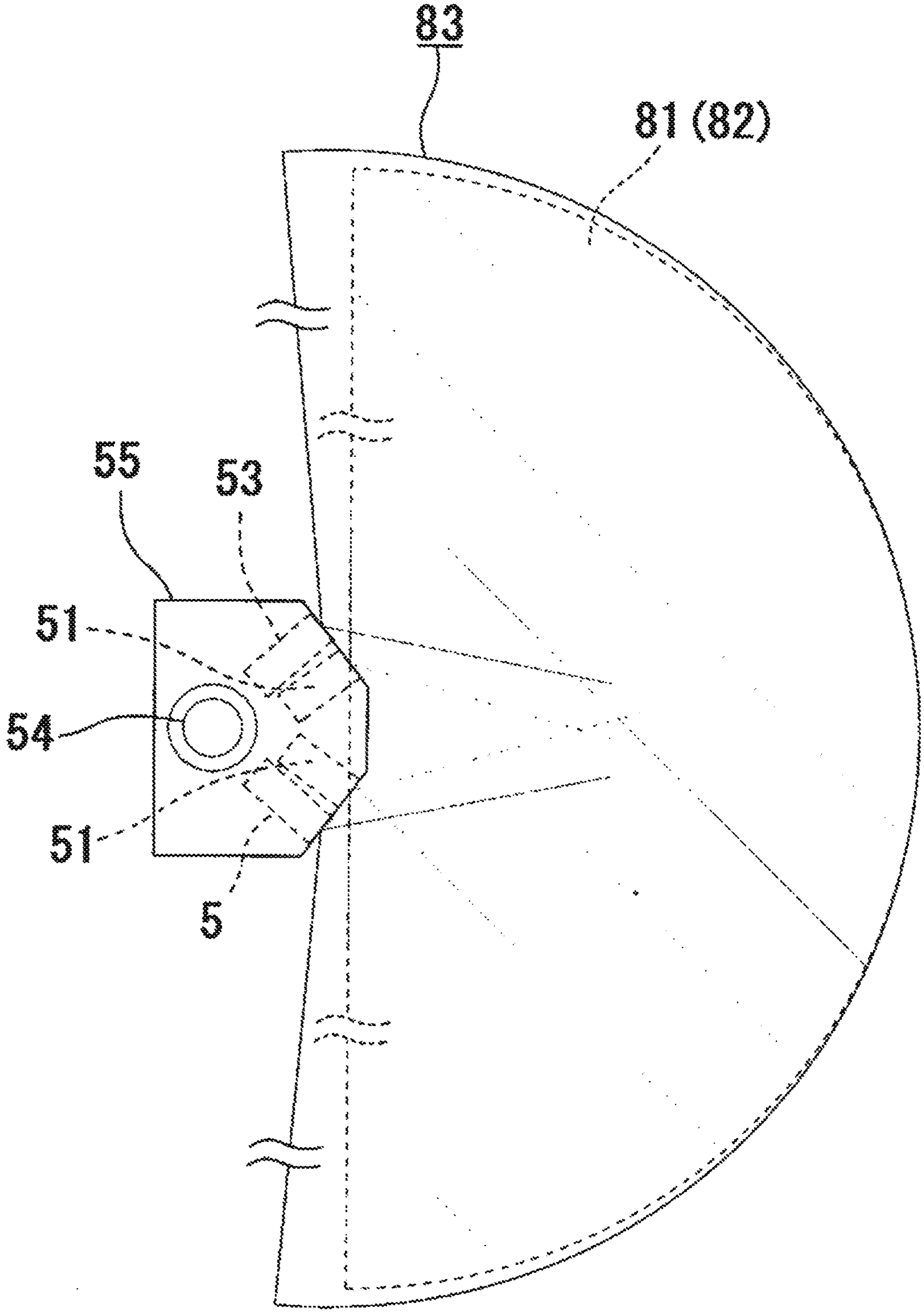
FIG. 4 is an explanatory plan view explaining an irradiation state of laser light by a laser light generator and visible light by a visible light generator.

That is, by overlaying on the laser passing surface 82 generated by the laser light generator 51 described above, or, by generating a visible light passing surface 83 (see FIGS. 4 and 5) which is a surface through which visible light diffused and irradiated by the visible light generator 53 passes in parallel with the laser light passing surface 82, a part of the crew's body and materials on the deck 30 cross the laser light passing surface 82 and at the same time cross the visible light passing surface 83, then a "line of light" due to visible light emerges on the surface of the body or material in the portion crossing the laser light passing surface 82 (visible light passing surface 83), as a result, the crew could recognize that a part of the body, materials and the like protrudes upward beyond the laser light passing surface 82 (visible light passing surface 83).

When the aerial work platform 1 is used near a vertical wall surface and the like, on this wall surface, a "line of light" indicating the generation position of the laser light passing surface 82 (visible light passing surface 83) emerges, whereby the crew can grasp the generation position of the laser light passing surface 82.

In this embodiment, as shown in FIG. 3, the above-mentioned laser light generator 51 and the visible light generator 53 are attached adjacent to each other in a common casing 55 to provide a unitized light generator, and this light generator is attached to the tip of the above-mentioned support rod 58, so that both the laser light generator 51 and the visible light generator 53 can be arranged at the above-mentioned laser light irradiation position rp.

In the illustrated embodiment, two laser light generators 51 and two visible light generators 53 are provided respectively, and the irradiation ranges of the two laser light generators 51 are combined to generate the above-mentioned laser light passing surface 82, and also the irradiation ranges of the two visible light generators 53 are combined to generate the visible light passing surface 83, however the laser light generator 51 and the visible light generator 53 may be provided one by one respectively, or may be provided in three or more.

In particular, when the laser light passing surface 82 is generated by a single laser light generator 51 using a wide-angle lens, there are advantages where not only can the cost be kept low by reducing the number of laser light generators 51 used, but also it is possible to prevent the variations in laser intensity that occur at the overlapping portion when the irradiation ranges of two or more laser light generators 51 are combined to generate the laser light passing surface 82, and to prevent the occurrence of vertical displacement of the laser light passing surface 82 caused by the individual difference between the two laser light generators 51.

Further, in the illustrated embodiment, although the above-mentioned support rod 58 is configured as a simple pole, the support rod 58 could be expandable and reducible in the height direction, for example, by having a telescopic structure, the arrangement height of the laser light generator 51 and the visible light generator 53 on the deck 30, that is, the height H1 of the laser light irradiation position rp could be made variable.

(4) Image Capturing Device

The laser light passing surface 82 generated by the above-mentioned laser light generator 51 is imaged obliquely from the bottom surface side thereof, with an image capturing device 52 (infrared camera in this embodiment) capable of capturing an image of light (with a wavelength of 940 nm in this embodiment) having the wavelength of the laser light of the planar beam 81 irradiated by the laser light generator 51 (see FIGS. 1 and 2).

As such an image capturing device 52, a known digital camera such as a CCD camera or a CMOS camera equipped with an image pickup element having sensitivity to light of the wavelength of the laser light described above can be used.

The image capturing device 52 is attached below the laser light generator 51, in the present embodiment, on the support rod 58 below the laser light generator 51 described above, so that the above-mentioned laser light passing surface 82 can be captured so as to look up from diagonally downward thereof.

(5) Sensor

Note that, reference numerals 54 in FIGS. 1 to 4 are sensors including proximity sensors such as ultrasonic sensors and contact sensors such as limit switches, and detect the proximity or contact of an upper obstacle with respect to the sensor 54.

In the illustrated embodiment, this sensor is a proximity sensor (ultrasonic sensor) 54, it is configured that the sensor 54 is attached to an upper surface of a casing 55 accommodating the laser light generator 51 and the visible light generator 53, and when an upper obstacle approaches within a detection distance (for example, 10 mm) of the proximity sensor 54 during the raising movement of the deck 30, the sensor detects the approach of the obstacle and output a detection signal.

(6) Reflecting Portion Detector

Figure 8:
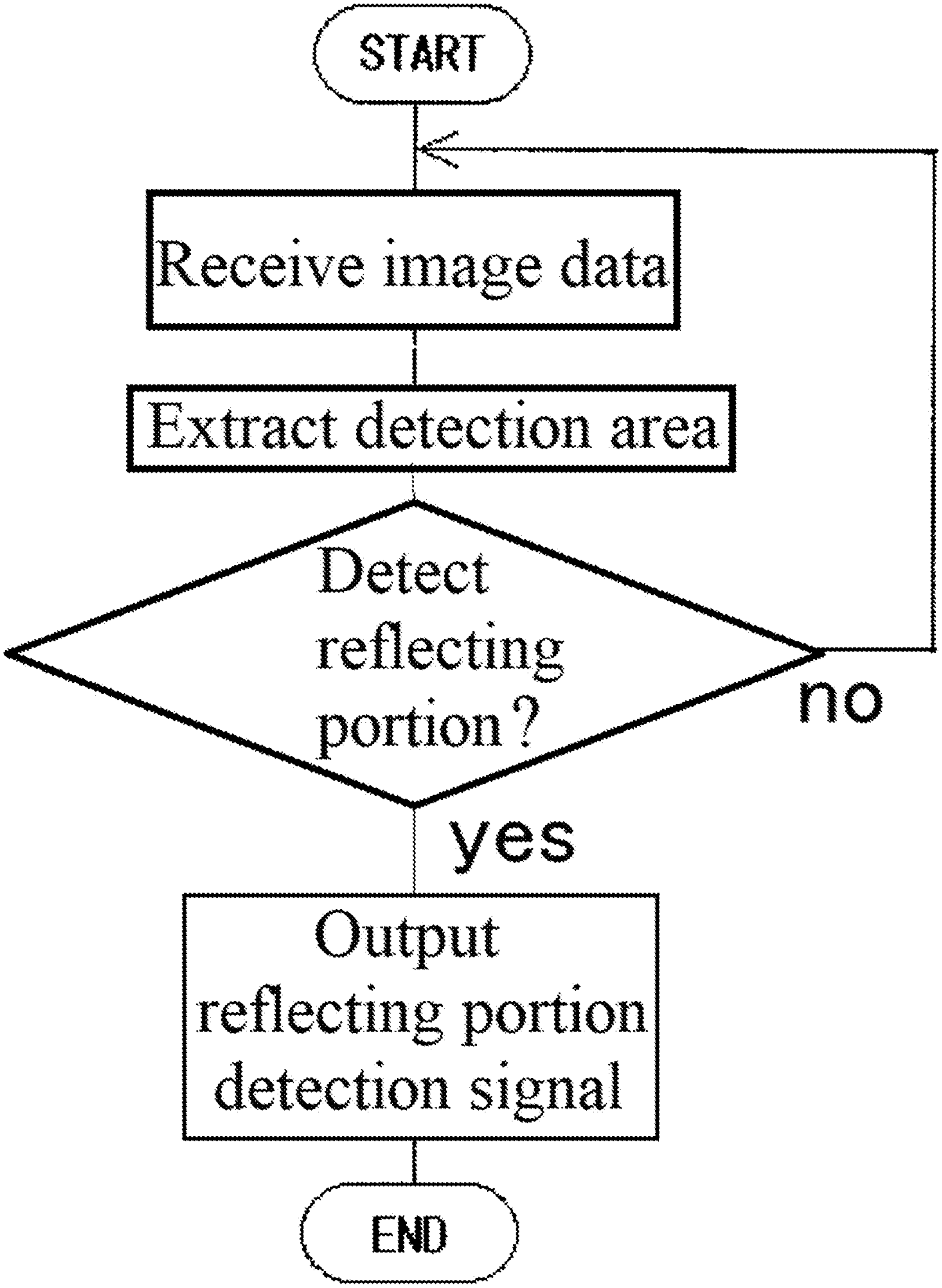
FIG. 8 is an operation flow diagram of the reflection part detection means.

The image data captured by the image capturing device 52 described above is sent to the image processing device 60, and in the reflecting portion detector 61 realized in the image processing device 60, as shown in FIG. 8, the predetermined range including the position above the deck 30 of the aerial work platform 1 is extracted as the detection area 85.

Then, the reflecting portion detector 61 determines whether or not there is a portion (reflecting portion) in which the planar beam 81 is reflected on the laser light passing surface 82 in the detection area 85 and detects the reflecting portion in the detection area 85, then, the detection signal is output to the raising movement regulator 71 of the control device 70 which will be described later.

(7) Raising Movement Regulator

As shown in FIG. 2, the above-mentioned raising movement regulator 71 is realized in the control device 70 provided on the aerial work platform 1 in the present embodiment.

Figure 9:
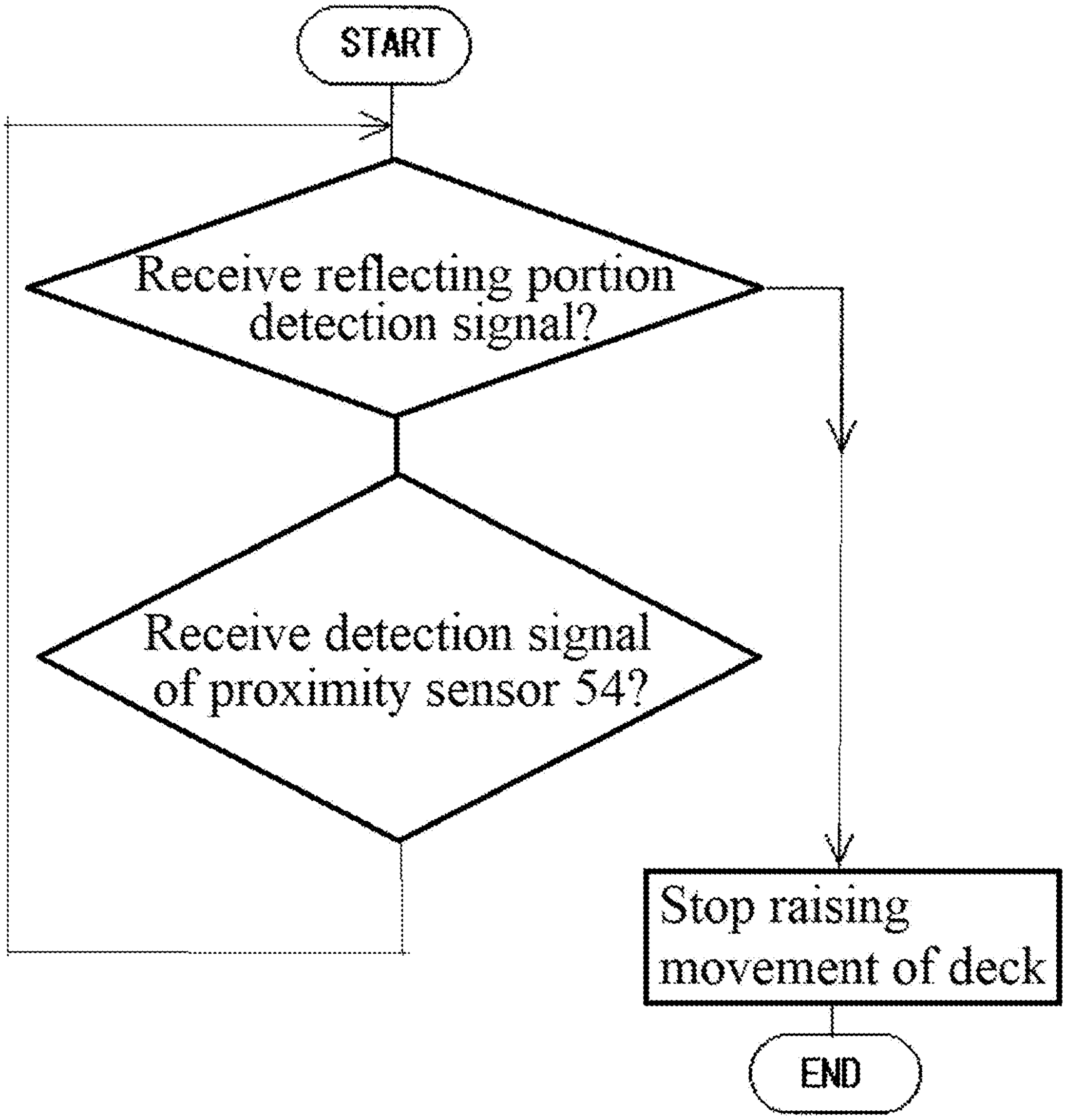
FIG. 9 is an operation flow diagram of the raising movement regulator.

As shown in FIG. 9, the raising movement regulator 71 receives a detection signal from the reflecting portion detector 61 of the image processing device 60 and a detection signal from the sensor (proximity sensor) 54, and when any of the detection signals is received, the elevation controller 73 is instructed to stop the raising movement of the deck 30.

(8) Sliding Position Detector

As described above, when the floor surface 32 of the deck 30 is configured to be slidable and the floor surface 32 of the deck 30 is configured to be extendable to the side of one end 30*a* of the deck 30, it may be configured that a sliding position detector 56 including such as a limit switch (not shown) for detecting the sliding position of the movable floor surface 32*a* provided on the deck 30 is provided, and the sliding position of the movable floor surface 32*a* detected by the sliding position detector 56 may be input to the detection area setting unit 62 realized in the above described image processing device 60.

(9) Detection Area Setting Unit

Figure 10:
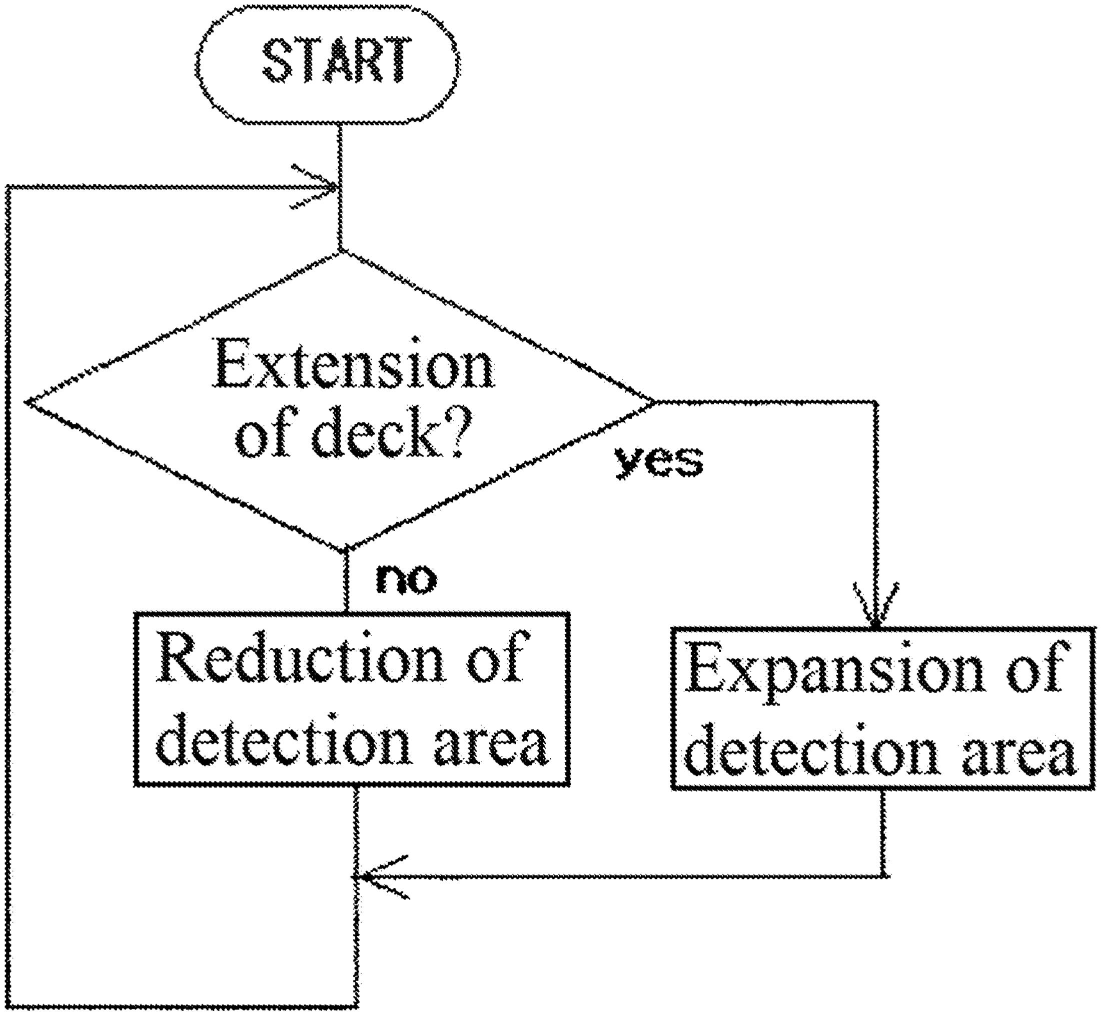
FIG. 10 is an operation flow diagram of the detection area setting unit.
Figure 11A:
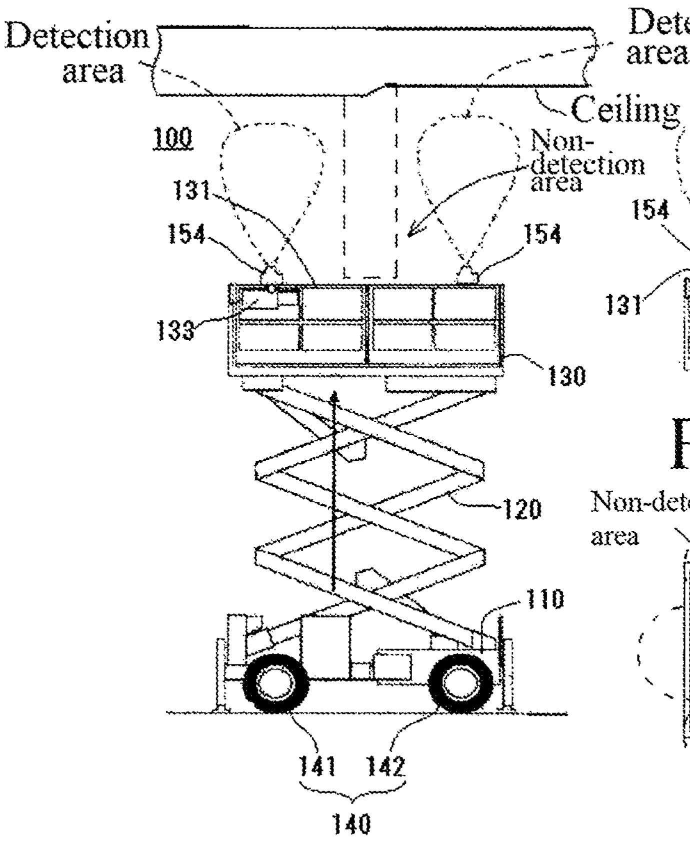
RELATED ART FIG. 11A
FIG. 11 is an explanatory drawing of a conventional aerial work platform equipped with a device for preventing collision with an upper obstacle (corresponding to Patent Document 1)
Figure 11B:
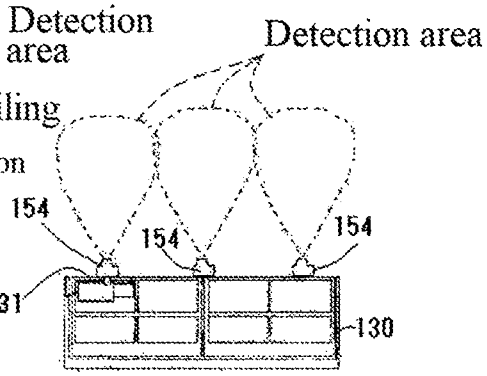
Figure 11C:
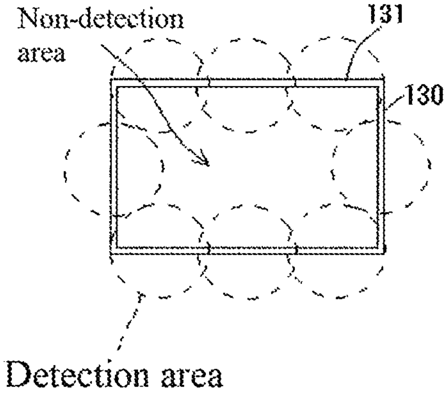
Figure 12:
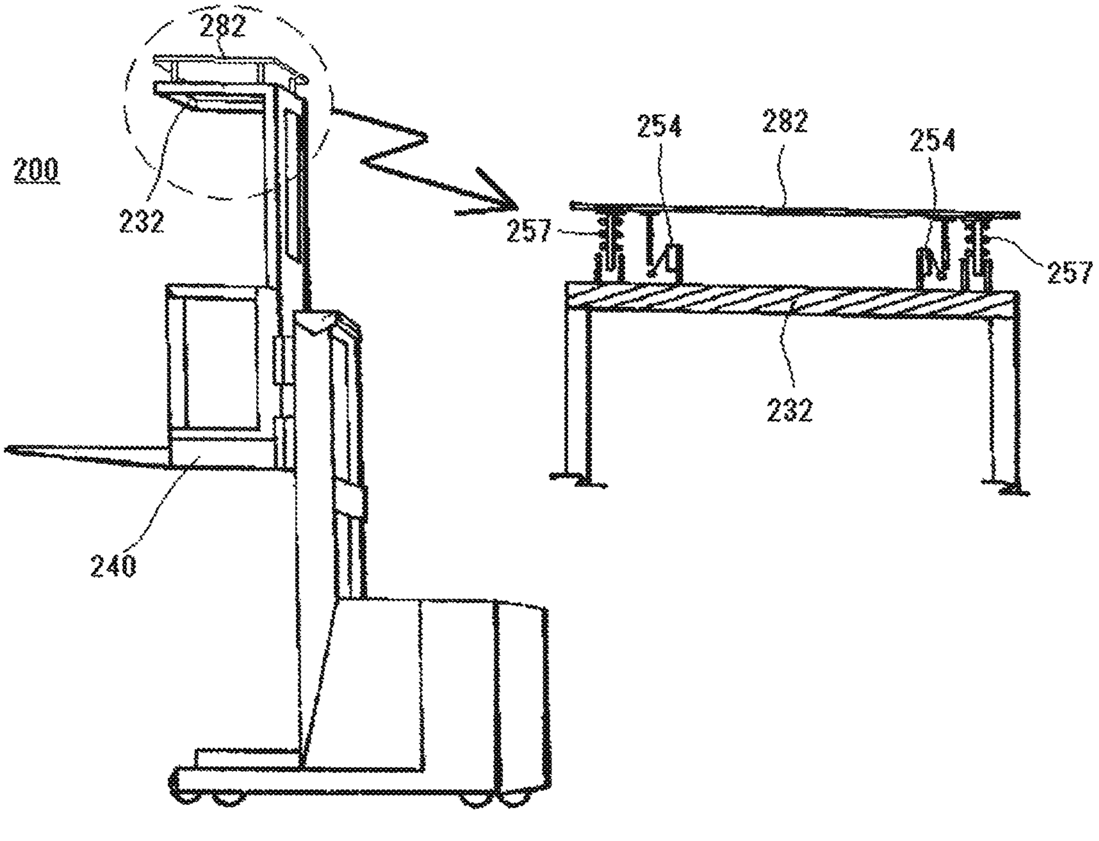
FIG. 12 RELATED ART
FIG. 12 is an explanatory drawing of the conventional forklift equipped with a device for preventing collision with upper obstacles (corresponding to Patent Document 2).

In this way, when the sliding position of the movable floor surface 32*a* detected by the sliding position detector 56 is input to the image processing device 60, the detection area setting unit 62 implemented in the image processing unit 60 determines whether the deck is in the expanded state or not based on the detection signal from the sliding position detector 56 as shown in FIG. 10 and changes the size of the aforementioned detection area 85 in accordance with the preset correspondence, such as expanding the detection area 85 when the floor surface 32 of the deck 30 is in the expanded state and reducing the detection area when the floor surface 32 of the deck 30 is in the reduced state, and expanding or reducing the detection area 85 corresponding to the expansion and reduction of the floor surface 32 of the deck 30, it can be configured so that the detection of the reflecting portion can be performed based on the appropriate detection area 85.

In this embodiment, the configuration in which the detection area 85 is changed into two stages of expansion and reduction has been described, yet the detection area 85 may be changed in two or more steps, or may be changed steplessly according to the sliding position of the movable floor surface 32*a*.

[Action, Etc.]

In the aerial work platform 1 provided with the device 50 for preventing collision with upper obstacles according to the present invention described above, when the raising operation of the deck 30 is started, the laser light generator 51 and the visible light generator 53 start irradiating the planar beam 81 and visible light, and at the same time, the image capturing device 52 captures an image of the laser light passing surface 82 diagonally from the bottom surface side from the lower side of the laser light generator 51, and the image data captured in this way is transmitted to the image processing device 60, then, by the reflecting portion detector 61 realized in the image processing apparatus 60, the appearance of the reflecting portion in the detection area 85 shown in FIG. 5 is monitored.

Further, at the same time as the deck 30 starts to rise, the proximity sensor 54 also starts to operate and the detection of the upper obstacles is started, and both the detection signal from the reflecting portion detector 61 and the detection signal from the proximity sensor 54 can be output to the raising movement regulator 71 of the control device 70.

If the raising movement of the deck 30 is continued in such a state, in the event that the upper obstacle above the deck 30 is composed of a ceiling and a lighting fixture projecting downward from the ceiling, for example, as shown in FIG. 6, when the deck 30 is raised below the upper obstacle, the lower end of the lighting fixture approaches the deck 30 during the raising movement prior to the ceiling.

Figure 6A:
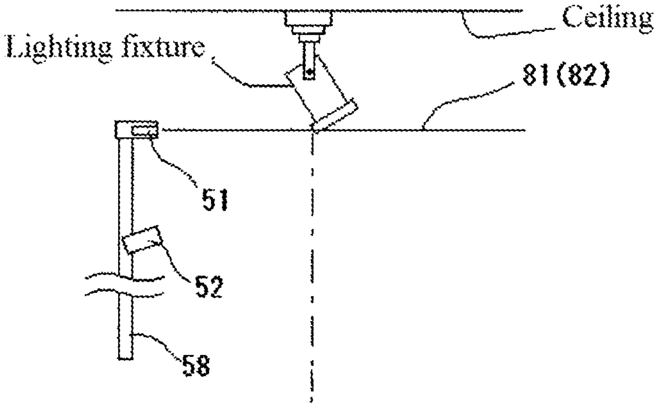
FIG. 6A is a side explanatory view in a state where the lower end of the lighting fixture has entered into the laser light passing surface.
Figure 6B:
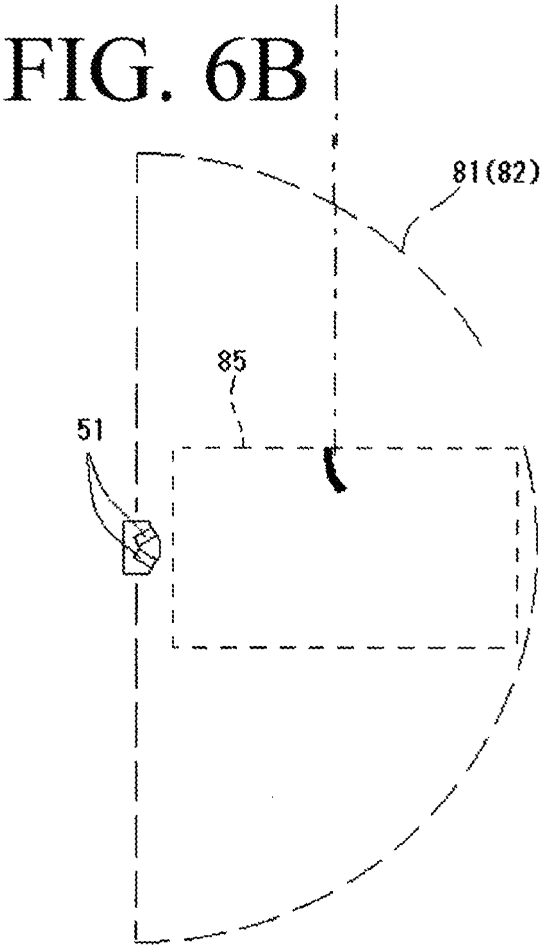
FIG. 6B is a plan explanatory view in a state where the lower end of the lighting fixture has entered into the laser light passing surface.

When the lower end of this lighting fixture is above the position corresponding to the detection area 85 as shown in FIGS. 6A and 6B, by the raising movement of the deck 30, the lower end of the lighting fixture reaches the laser light passing surface 82 in the detection area 85, then, among the planar beam 81 emitted from the laser light generator 51, the beam collided with the lower end portion of the lighting fixture are reflected.

Figure 6C:
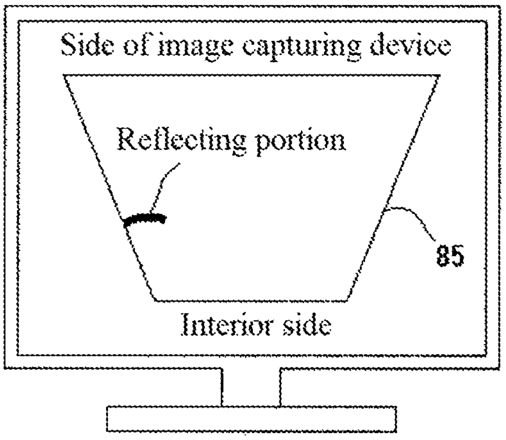
FIG. 6C is a captured image in a state where the lower end of the lighting fixture has entered into the laser light passing surface.

When the formation space of the laser light passing surface 82 is captured by the image capturing device 52 placed below the laser light generator 51 so as to look up obliquely, at the laser light passing surface 82 of the portion where the lower end of the lighting fixture reaches, the laser light (infrared ray) of the planar beam 81 collides with the lower end of the lighting fixture and is reflected, and a portion (reflecting portion) where the planar beam 81 is reflected appears in the captured image, as shown in FIG. 6C by capturing this reflected light with the image capturing device 52.

Therefore, when the appearance of this reflecting portion is confirmed in the portion corresponding to the detection area 85 in the captured image, it can be determined that the upper obstacle is approaching the generation position of the laser light passing surface 82 on the deck 30.

Therefore, based on the detection signal that the reflecting portion detector 61 has detected the reflecting portion, the raising movement regulator 71 of the control device 70 cause the elevation controller 73 to perform a process for stopping the raising movement of the deck 30, thereby it can prevent the deck 30 and the crew from being collided with the upper obstacle by preventing the upper obstruct from approaching to the deck 30 any father.

In FIG. 6C, the reflecting portion is indicated in the image displayed on the monitor screen in order to facilitate understanding of a concept of "reflecting portion", yet in the present invention, the display of an image on the monitor screen is not essential for the detection of the reflecting portion.

Figure 7A:
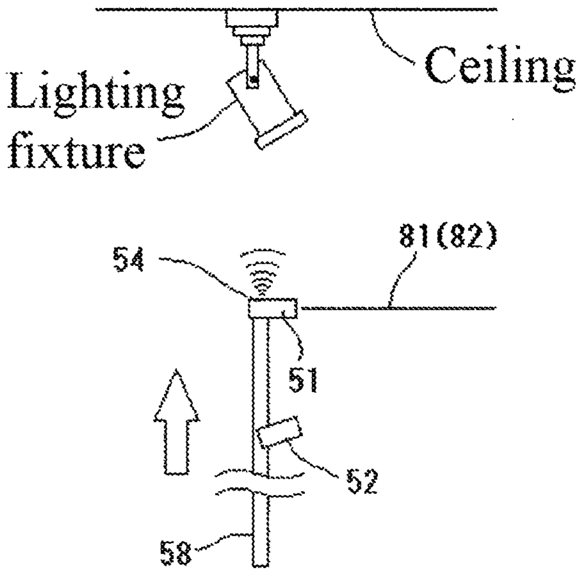
FIG. 7A is an explanatory drawing of the detection state of the upper obstacle by a sensor in a case where a lighting fixture attached to the ceiling as an upper obstacle is detected.
Figure 7C:
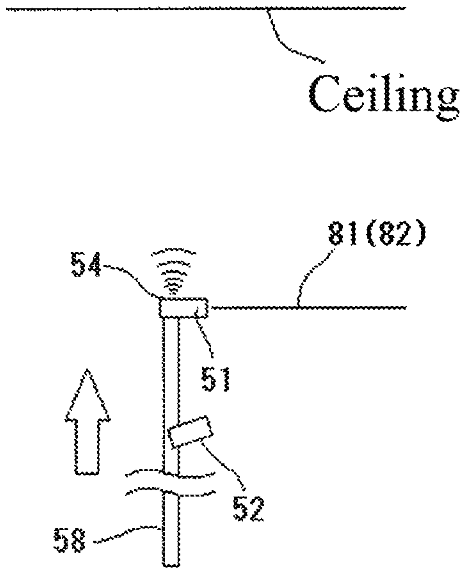
FIG. 7C is an explanatory drawing of the detection state of the upper obstacle by a sensor in a case where the ceiling is detected as an upper obstacle.
Figure 7B:
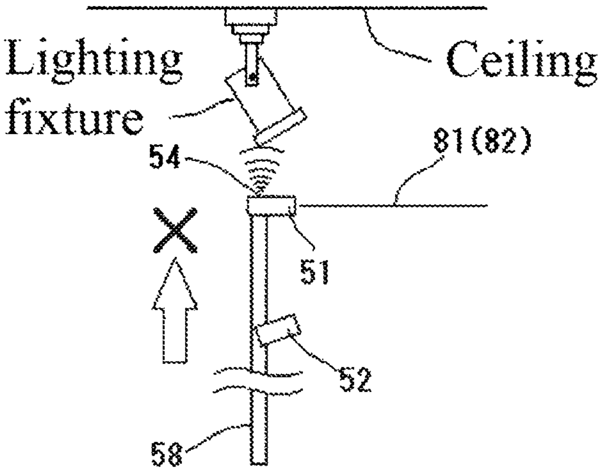
FIG. 7B is an explanatory drawing of the detection state of the upper obstacle by a sensor in a case where a lighting fixture attached to the ceiling as an upper obstacle is detected.
Figure 7D:
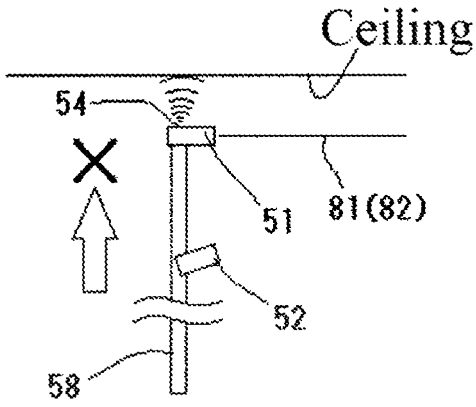
FIG. 7D is an explanatory drawing of the detection state of the upper obstacle by a sensor in a case where the ceiling is detected as an upper obstacle.

On the other hand, as shown in FIGS. 7A and 7B, when the above-mentioned lighting fixture exists directly above the laser light generator 51, or, as shown in FIGS. 7C and 7D, when the upper obstacle is a flat surface having only a ceiling and no downward protrusion, in the event that the deck 30 is raised, before the upper obstacle reaches the laser light passing surface 82, the upper obstacle approaches the laser light generator 51 attached to the tip of the support rod 58, and if this is left unattended, there is a risk that the laser light generator 51 will collide with an upper obstacle and be damaged.

However, since the proximity sensor 54 is provided on the upper surface of the laser light generator 51, when an upper obstacle approaches the proximity sensor 54 by a predetermined distance (for example, 10 mm), the proximity sensor 54 outputs a detection signal which detected an upper obstacle.

Then, the raising movement regulator 71 that has received the detection signal from the proximity sensor 54 stops the raising movement of the deck 30 with respect to the elevation controller 73, and by stopping the raising movement of the deck 30, the collision of the upper obstacle to the laser light generator 51 can also be avoided.

DESCRIPTION OF REFERENCE NUMERALS

1. Aerial work platform
10. Undercarriage
20. Elevating mechanism (scissors link mechanism)
30. Deck
30*a*. One end (of the deck 30)
30*b*. Other end (of the deck 30)
31. Safety barrier
32. Floor surface
32*a*. Movable floor surface
32*b*. Fixed floor surface
33. Control panel
40. Traveling device
41. Front wheels
42. Rear wheels
50 Device for preventing collision with an upper obstacle
51. Laser light generator
52. Image capturing device (Infrared camera)
53. Visible light generator
54. Sensor (Proximity sensor)
55. Casing
56. Sliding position detector
58. Support rod
60. Image processing device
61. Reflecting portion detector
62. Detection area setting unit
70. Control device
71. Raising movement regulator
72. Travel controller
73. Elevation controller
74. Floor slide controller
81. Planar beam
82. Laser light passing surface
83. Visible light passing surface
85. Detection area
100. Aerial work platform
110. Undercarriage
120. Elevating mechanism (scissor link mechanism)
130 Deck
131. Safety rail
133. Control panel
140. Traveling device
141, 142. Wheels
154. Proximity sensor
200. Forklift
232. Head guard
240. Lift
254. Sensor (limit switch)
257. Spring
282. Obstacle detection plate
H1. Height
rp. Laser light irradiation position

What is claimed is:

1. A method for preventing collision with an upper obstacle for an aerial work platform provided with an undercarriage, a deck raising and lowering above the undercarriage, and an elevating mechanism to cause the deck to raise and lower, comprising:

irradiating laser light as a planar beam which is diffused in a planar shape parallel to a floor surface of the deck from a laser light irradiation position located at a position with a predetermined height with respect to an upper end of the deck at either end side of the deck during raising movement of the deck, and generating a laser light passing surface which is a surface through which the irradiated planar beam passes;

capturing an image of the laser light passing surface from a bottom surface side of the laser light passing surface by an image capturing device capable of capturing an image of light having wavelength of the laser light from a lower side of the laser light irradiation position at the end side of the deck; and setting a predetermined range of the captured image including a portion above the deck and corresponding to the floor surface of the deck as a detection area and stopping the raising movement of the deck when a reflecting portion of the planar beam appears in the detection area.

2. The method for preventing collision with the upper obstacle for the aerial work platform according to claim 1 comprising:

monitoring approach of the upper obstacle to the laser light irradiation position; and stopping the raising movement of the deck not only when the reflecting portion appears in the detection area but also when the upper obstacle approaches to a predetermined position with respect to the laser light irradiation position.

3. The method for preventing collision with the upper obstacle for the aerial work platform according to claim 2, wherein the laser light is invisible light, and visible light is irradiated from a position adjacent to the laser light irradiation position in the planner shape parallel to the floor surface of the deck.

4. The method for preventing collision with the upper obstacle for the aerial work platform according to claim 1, wherein the laser light is invisible light, and visible light is irradiated from a position adjacent to the laser light irradiation position in the planner shape parallel to the floor surface of the deck.

5. A device for preventing collision with an upper obstacle for an aerial work platform provided with an undercarriage, a deck raising and lowering above the undercarriage, and an elevating mechanism to cause the deck to raise and lower, comprising:

a laser light generator for irradiating laser light as a planar beam diffused in a planner shape parallel to a floor surface of the deck from a laser light irradiation position at a position with a predetermined height with respect to an upper end of the deck at either end side of the deck during raising movement of the deck to generate a laser light passing surface which is a surface through which the irradiated planar beam passes;

an image capturing device capable of capturing an image of light having wavelength of the laser light, which is provided below the laser light generator at the end side of the deck for capturing an image of the laser light passing surface from a bottom surface side of the laser light passing surface;

a reflecting portion detector setting a predetermined range of the image captured by the image capturing device, including a portion above the deck and corresponding to the floor surface of the deck as a detection area and detecting appearance of a reflecting portion of the planar beam in the detection area; and a raising movement regulator for stopping the raising movement of the deck when the reflecting portion detector detects that the reflecting portion of the planar beam appears.

6. The device for preventing collision with the upper obstacle for the aerial work platform according to claim 5, wherein a sensor for detecting proximity or contact of the upper obstacle is attached to the laser light generator; and the raising movement regulator stops the raising movement of the deck not only when the reflecting portion detector detects that the reflecting portion appears in the detection area, but also when the sensor detects proximity or contact of the upper obstacle.

7. The device for preventing collision with the upper obstacle for the aerial work platform according to claim 6, wherein the deck is an extension deck having a movable floor surface that slides on a fixed floor surface, and an area of the floor surface is expanded by sliding the movable floor surface;

the deck is provided with a sliding position detector for detecting a sliding position of the movable floor surface, and also provided with a detection area setting unit for changing a setting range of the detection area corresponding to the sliding position of the movable floor surface detected by the sliding position detector.

8. The device for preventing collision with the upper obstacle for the aerial work platform according to claim 7, wherein the laser light generator is an invisible light laser generator; and a visible light generator to diffuse and irradiate visible light in a planner shape parallel to the floor surface of the deck is provided adjacent to the laser light generator.

9. The device for preventing collision with the upper obstacle for the aerial work platform according to claim 6, wherein the laser light generator is an invisible light laser generator; and a visible light generator to diffuse and irradiate visible light in a planner shape parallel to the floor surface of the deck is provided adjacent to the laser light generator.

10. The device for preventing collision with the upper obstacle for the aerial work platform according to claim 4, wherein the deck is an extension deck having a movable floor surface that slides on a fixed floor surface, and an area of the floor surface is expanded by sliding the movable floor surface;

the deck is provided with a sliding position detector for detecting a sliding position of the movable floor surface, and also provided with a detection area setting unit for changing a setting range of the detection area corresponding to the sliding position of the movable floor surface detected by the sliding position detector.

11. The device for preventing collision with the upper obstacle for the aerial work platform according to claim 10, wherein the laser light generator is an invisible light laser generator; and a visible light generator to diffuse and irradiate visible light in a planner shape parallel to the floor surface of the deck is provided adjacent to the laser light generator.

12. The device for preventing collision with the upper obstacle for the aerial work platform according to claim 5, wherein the laser light generator is an invisible light laser generator; and a visible light generator to diffuse and irradiate visible light in a planner shape parallel to the floor surface of the deck is provided adjacent to the laser light generator.

* * * * *